United States Patent
Borlick et al.

(10) Patent No.: US 10,528,339 B2
(45) Date of Patent: Jan. 7, 2020

(54) COGNITIVE FEATURE BASED CODE LEVEL UPDATE

(71) Applicant: International Business Machines Corporation, Armonk, NY (US)

(72) Inventors: Matthew G. Borlick, Tucson, AZ (US); Lokesh M. Gupta, Tucson, AZ (US); Micah Robison, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 15/464,169

(22) Filed: Mar. 20, 2017

(65) Prior Publication Data

US 2018/0267788 A1   Sep. 20, 2018

(51) Int. Cl.
*G06F 8/654* (2018.01)
*G06F 8/65* (2018.01)
*G06F 11/07* (2006.01)

(52) U.S. Cl.
CPC .............. *G06F 8/654* (2018.02); *G06F 8/65* (2013.01); *G06F 11/0709* (2013.01); *G06F 11/0793* (2013.01)

(58) Field of Classification Search
CPC .................................. G06F 8/65; G06F 8/654
USPC ........................................................ 717/172
See application file for complete search history.

(56) References Cited

U.S. PATENT DOCUMENTS

| 6,880,108 | B1 | 4/2005 | Gusler et al. |
| 6,990,660 | B2 | 1/2006 | Moshir et al. |
| 7,191,435 | B2 | 3/2007 | Lau et al. |
| 8,151,248 | B1* | 4/2012 | Butler ................. G06F 11/3692 717/124 |
| 9,239,989 | B2 | 1/2016 | Bouqata et al. |
| 2004/0205709 | A1* | 10/2004 | Hiltgen ..................... G06F 8/65 717/115 |
| 2005/0033866 | A1* | 2/2005 | Besson ..................... G06F 8/65 710/1 |
| 2005/0262496 | A1* | 11/2005 | Seki ........................ G06F 21/10 717/170 |
| 2008/0134176 | A1* | 6/2008 | Fitzgerald ........... G06F 9/45537 718/1 |

(Continued)

FOREIGN PATENT DOCUMENTS

| CN | 103365676 A | 10/2013 |
| CN | 105812936 A | 7/2016 |

*Primary Examiner* — James D. Rutten

(74) *Attorney, Agent, or Firm* — Kunzler Bean & Adamson

(57) ABSTRACT

For implementing cognitive feature based code level updates, an apparatus is disclosed. In some embodiments, the apparatus includes a detection module that detects components operating at a client site, collects information associated with the detected components, and identifies defects in the detected components based on the collected information. The apparatus includes a network module that transfers the collected information to a host apparatus and receives a flash issuance from the host apparatus based on the collected information transferred to the host apparatus. The apparatus includes a repair module that retrieves a fix list from the flash issuance received from the host apparatus and implements the fix list for the detected components when defects are identified in the detected components.

14 Claims, 4 Drawing Sheets

(56) References Cited

U.S. PATENT DOCUMENTS

| | | | | |
|---|---|---|---|---|
| 2008/0208365 A1* | 8/2008 | Grgic | G05B 19/042 | 700/2 |
| 2011/0314331 A1* | 12/2011 | Beach | G06F 11/0739 | 714/26 |
| 2012/0144383 A1* | 6/2012 | Mishra | G06F 11/1433 | 717/173 |
| 2013/0074061 A1* | 3/2013 | Averbuch | G06F 8/665 | 717/171 |
| 2014/0032962 A1* | 1/2014 | Deshpande | G06F 11/0793 | 714/15 |
| 2014/0344799 A1* | 11/2014 | Thodati | G06F 8/654 | 717/171 |
| 2015/0033216 A1* | 1/2015 | Appadurai | G06F 8/656 | 717/169 |
| 2017/0046152 A1* | 2/2017 | Shih | G06F 8/654 | |

* cited by examiner

COGNITIVE FEATURE BASED CODE LEVEL UPDATE

FIELD

The subject matter disclosed herein relates to a system, an apparatus, and/or a method for implementing cognitive feature based code level updates.

BACKGROUND

In conventional storage systems, a storage controller is employed to connect one or more hosts devices, such as servers, mainframe computers, and similar, with one or more storage devices, such as hard disk drives, magnetic tape drives, optical storage drives, and similar. The storage controller may include an interconnection module having one or more host ports that are configured to connect to a host via a communication channel. The interconnection module may also include one or more logical devices that may be used to emulate a storage device. The host may connect to and access each of the logical devices through the interconnection module. Further, at diverse times, the storage controller may need updates for components or features running in a client environment. For instance, in some cases, field outages may happen when storage controllers are running old code levels, and the code has not been upgraded despite several flashes in the field. One problem with lack of compliance for implementing flash upgrades is that some flashes may be considered generic, and it may be difficult to determine whether fixes in the flashes are needed. In these cases, some flash upgrades may be skipped. As such, there exists a need to identify targeted client environments that may be impacted by code level upgrades.

BRIEF SUMMARY

An apparatus for implementing cognitive feature based code level updates is disclosed herein. In one embodiment, the apparatus includes a detection module that detects components operating at a client site, collects information associated with the detected components, and identifies defects in the detected components based on the collected information. The apparatus further includes a network module that transfers the collected information to a host apparatus and receives a flash issuance from the host apparatus based on the collected information transferred to the host apparatus. The apparatus further includes a repair module that retrieves a fix list from the flash issuance received from the host apparatus and implements the fix list for the detected components when defects are identified in the detected components.

A method for implementing cognitive feature based code level updates is disclosed. In one embodiment, the method includes detecting components operating at a client site, collecting information associated with the detected components, and identifying defects in the detected components based on the collected information. The method further includes transferring the collected information to a host apparatus and receiving a flash issuance from the host apparatus based on the collected information transferred to the host apparatus. The method further includes retrieving a fix list from the flash issuance received from the host apparatus and implementing the fix list for the detected components when defects are identified in the detected components.

A computer program product that performs the functions of the method is disclosed. In one embodiment, the computer program product includes non-transitory computer readable storage media having program instructions embodied therewith, the program instructions are readable/executable by a computer to cause the computer to detect components operating at a client site, collect information associated with the detected components, and identify defects in the detected components based on the collected information. The program instructions further cause the computer to transfer the collected information to a host apparatus and receive a flash issuance from the host apparatus based on the collected information transferred to the host apparatus. The program instructions further cause the computer to retrieve a fix list from the flash issuance received from the host apparatus and implement the fix list for the detected components when defects are identified in the detected components.

A device for implementing cognitive feature based code level updates is disclosed. In one embodiment, the device includes a processor and memory having stored thereon instructions that, when executed by the processor, cause the processor to detect components operating at a client site, collect information associated with the detected components, and identify defects in the detected components based on the collected information. The instructions further cause the processor to transfer the collected information to a host apparatus and receive a flash issuance from the host apparatus based on the collected information transferred to the host apparatus. The instructions further cause the processor to retrieve a fix list from the flash issuance received from the host apparatus and implement the fix list for the detected components when defects are identified in the detected components.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
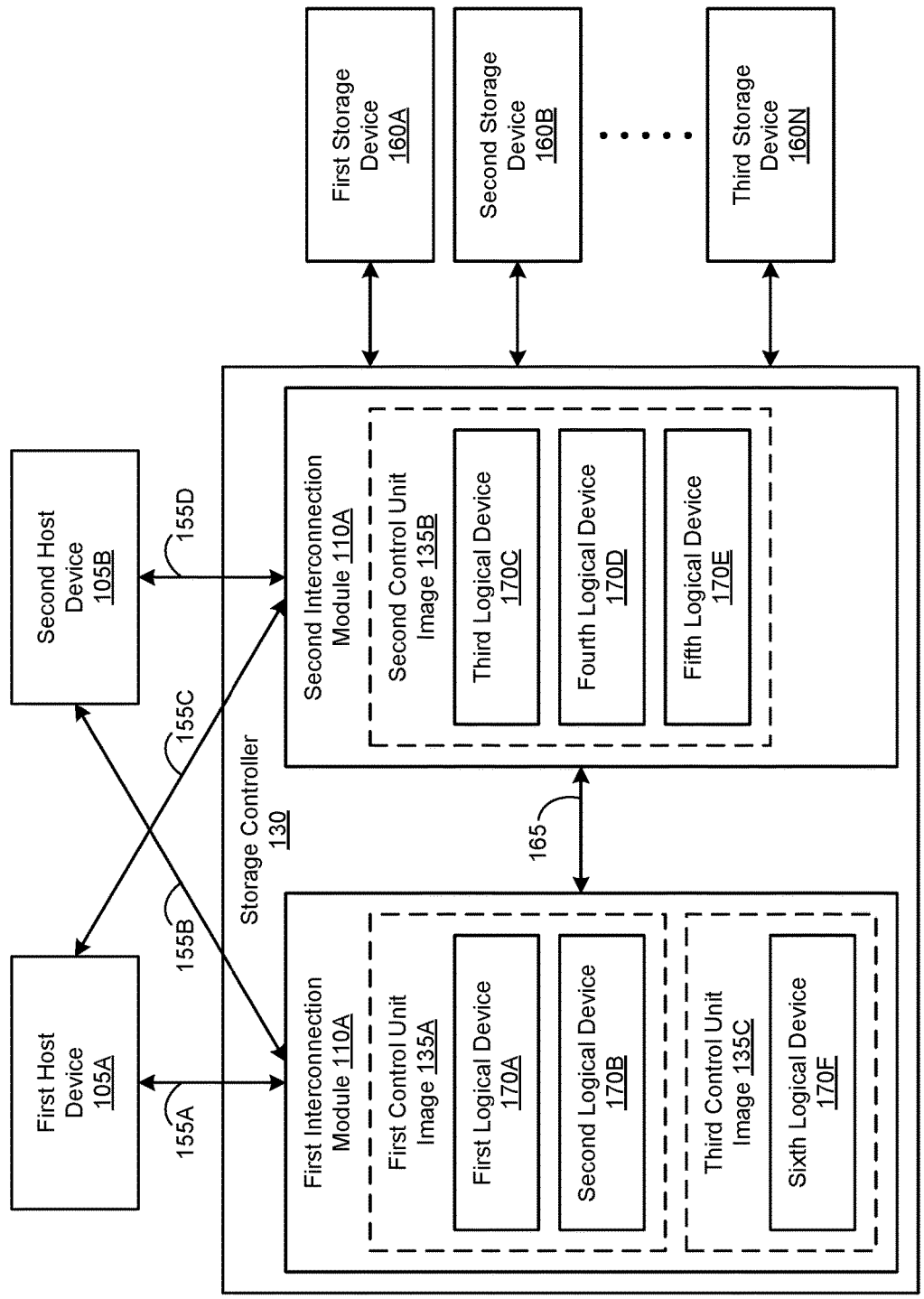
FIG. 1 is a block diagram illustrating one embodiment of a system having an apparatus for implementing cognitive feature based code level updates.

Reference throughout the present specification to "one embodiment," "an embodiment," or similar language means that a particular feature, structure or characteristic described in connection with the embodiment may be included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof may mean "including but not limited to" unless expressly specified otherwise. An enumerated listing of items does not imply that any or all of the items are mutually exclusive and/or mutually inclusive, unless expressly specified otherwise. The terms "a," "an," and "the" may also refer to "one or more" unless expressly specified otherwise.

The described features, advantages, and characteristics of the embodiments may be combined in any suitable manner. One skilled in relevant art may recognize that embodiments may be practiced without one or more of the specific features or advantages of a particular embodiment. In other instances, additional features and advantages may be recognized in certain embodiments that may not be present in all embodiments.

Various implementations described herein may be a system, method, and/or computer program product. The computer program product may include a non-transitory computer readable storage medium having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or similar, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, e.g., programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of various systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, functions noted in the block may occur out of the order noted in the Figures. For example, two blocks shown in succession may, in fact, be executed substantially concurrently, or the blocks may sometimes be executed in the reverse order, depending upon the functionality involved. It should be noted that each block of the block diagrams and/or the flowchart illustration, and combinations of blocks in the block diagrams and/or flowchart illustration, may be implemented by special purpose hardware-based systems that perform the specified functions or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or similar.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to thereby provide a thorough understanding of embodiments. One skilled in the relevant art will recognize, however, that embodiments may be practiced without one or more of the specific details, or with other methods, components, materials, and so forth. In some other instances, well-known structures, materials, or operations are not shown or described in detail to avoid obscuring aspects of an embodiment.

FIG. 1 is a block diagram illustrating one embodiment of a storage access system 100 in accordance with implementations described herein. The system 100 includes one or more hosts 105, a storage controller 130, and one or more storage devices 160. The storage controller 130 includes one or more interconnection modules 110 and one or more control unit images (CUIs) 135. Each CUI 135 may be implemented as a virtual module that is emulated by the storage controller 130, and each CUI 135 is depicted with one or more logical devices 170. Although the system 100 is depicted with two interconnection modules 110, three CUIs 135, six logical devices 170, and three storage devices 160, any number of interconnection modules 110, CUIs 135, logical devices 170, and storage devices 160 may be employed.

The host 105 may be a server, a mainframe computer, or similar. The host may be remotely located. In one embodiment, the host 105 may be implemented with a zSeries mainframe such as, e.g., a z/390 manufactured by International Business Machines Corporation ("IBM") of Armonk, N.Y. The host 105 accesses data and information stored on the logical devices 170 through the storage controller 130. Each logical device 170 may emulate a storage device 160 such as a hard disk drive, an optical storage device, a magnetic tape drive, or similar. In addition, each logical device 170 may include portions of one or more storage devices 160. In one embodiment, the storage controller 130 may be configured as a redundant array of independent disk ("RAID") controller. In another embodiment, the storage controller 130 may be configured as a data cache. In another embodiment, the storage controller 130 may be implemented with a DS/8000 or DS/6000 storage facility manufactured by IBM of Armonk, N.Y.

The storage controller 130 organizes the logical devices 170 as one or more CUIs 135. The CUI 135 is a management group. In one embodiment, a CUI 135 includes up to two hundred and fifty-six (256) logical devices 170. For example, the first CUI 135A is depicted as having the first logical device 170A and the second logical device 170B. Each logical device 170 may be configured to virtualize one or more storage devices 160, such as, e.g., hard disk drives, optical storage devices, or similar.

The interconnection module 110 manages one or more CUIs 135. The host 105 may be configured to stores data to and retrieve data from the logical device 170 through the interconnection module 110. Each interconnection module 110 may manage each CUI 135. For example, in FIG. 1, the first interconnection module 110A is depicted as managing the first and third CUI 135A, 135C. In some cases, if the first interconnection module 110A fails, management of the first and third CUI 135A, 135C may be transferred to the second interconnection module 110B.

The host 105 accesses the logical device 170 through a path. The path may include one or more communication channels. In the depicted embodiment, the path may include one or more host communication channels 155 between the first and second host 105A, 105B and the storage controller 130. The host communication channel 155 may be a network connection or similar. The path may also include one or more interconnection modules 110 of the storage controller 130. Each interconnection module 110 may be configured with a plurality of host ports for connecting to the host communication channel 155. Thus, the first host 105A may communicate with the first logical device 170A of the first CUI 135A through a host port, the first host communication channel 155A, and the first interconnection module 110A.

Each interconnection module 110 may be redundant and may perform the interconnection function of at least one other interconnection module 110. In addition, each interconnection module 110 may communicate with at least one other interconnection module 110 through an internal communication channel 165. The internal communication channel 165 may be a digital electrical signal bus or similar. If the first interconnection module 110A fails, functions of the first interconnection module 110A may be performed by the second interconnection module 110B.

For example, the first host 105A may communicate with the third logical device 170C of the second CUI 135B through a first path comprising the second host communication channel 155B, and the second interconnection module 110B. If the second host communication channel 155B fails, the first host 105A may continue to communicate with the third logical device 170C via a second path including the first host communication channel 155A, the first interconnection module 110A, and the internal communication channel 165. In some cases, if the second interconnection module 110B fails, management of the second CUI 135B and the third, fourth, and fifth logical devices 170C, 170D, 170E are transferred to the first interconnection module 110A and the first host 105A may continue to communicate with the third, fourth, and fifth logical devices 170C, 170D, 170E through the second path including the first host communication channel 155A and the first interconnection module 110A.

Both the first path and the second path are viable paths for connecting the first host 105A and the third logical device 170C. Each path may provide a different level of performance for communications between the first host 105A and the third logical device 170C. For example, because the second path includes the internal communication channel 165, the second path may have lower communications performance than the first path. However, because each path between a host 105 and a CUI 135 is valid, the host 105 may connect to the CUI 135 through a path with lower communications performance. The implementations provided herein support the host 105 accessing the CUI 135 through a preferred path such as a higher communications performance path.

The storage controller 130 receives a request from the host 105 to identify a plurality of host communication paths 155 from the host 105 to the CUI 135. The storage controller 130 reports each path to the host 105 and status of the path. The status identifies each host communication path 155 as preferred or non-preferred. In one embodiment, the status identifies if the path is available. For example, the first host 105A may communicate a request to the storage controller 130 for paths to the first CUI 135A and the storage controller 130 may report one or more paths including a path with a preferred status or preferred path comprising the first host communication channel 155A and a path with non-preferred status or non-preferred path comprising the second host communication channel 155B. This provides sufficient information to allow the host 105 to direct I/O requests for logical devices 170 on a given CUI 135 to the storage controller 130 via communication paths 155 that are preferred for that CUI 135. The host 105 typically connects to the storage controller 130 through all available paths but I/O requests for a given CUI 135 are directed through preferred paths as long as they are available. A given communication path may be preferred for certain CUIs 135 and non-preferred for other CUIs 135.

Along with providing communication between one or more host devices 105 and one or more storage controllers 160A, 160B, . . . , 160N, the storage controller 130 may include a cognitive module to detect and track various components and/or features that are running in a client environment at a client site. As such, the storage controller 130 may collect information associated with components and/or features used at a client site and transfer this connected information to one or more host devices, such as, e.g., the first and/or second host devices 105A, 105B. When a fix that impacts a client environment is implemented, the storage controller 130 may store, record, and/or register which feature the fix is related to. When a flash is issued, the storage controller 130 may notify clients that are running certain features of the risk without running with the fix.

Therefore, as further described herein below, the storage controller 130 may include a cognitive module that detects and tracks components and/or features running in a client environment at a client site. The cognitive module may be running in the storage controller 130, and when a certain component or feature is running, the cognitive module may collect data and information associated with the certain component or feature. Also, the cognitive module may collect code level data running at the client site. Periodically, the cognitive module may transfer the collected information about certain components and/or features to an analytic service host device. In some implementations, the cognitive module may refer to defect tracking software. When a fix that impacts a client environment is implemented, the cognitive module may store and/or record a code level when exposure occurred, a feature impacted by the defect, and a code level where fix is available. This information may gathered or collected in a database. In some cases, a flash issuance may be periodically generated, compared with a feature defects database, and a fix list may then be generated for flashes. Defects in certain features may be matched to client environments running those certain features, and a code level running at the client site may be compared with the code level when exposure was introduced. Further, the code level when a fix was introduced may also be compared. If the code level at the client site has exposure but does not have the fix, then the client site may be added to a flash list. This entry may include a defect number, a code level with a fix, and a feature pertaining to the fix. After the flash list is generated, flashes may be transferred to client sites for each entry in the list. Flash lists may include a defect number, a code level with a fix, and a feature exposed. Some clients may disable the feature with exposure until the fix is implemented.

Figure 2:
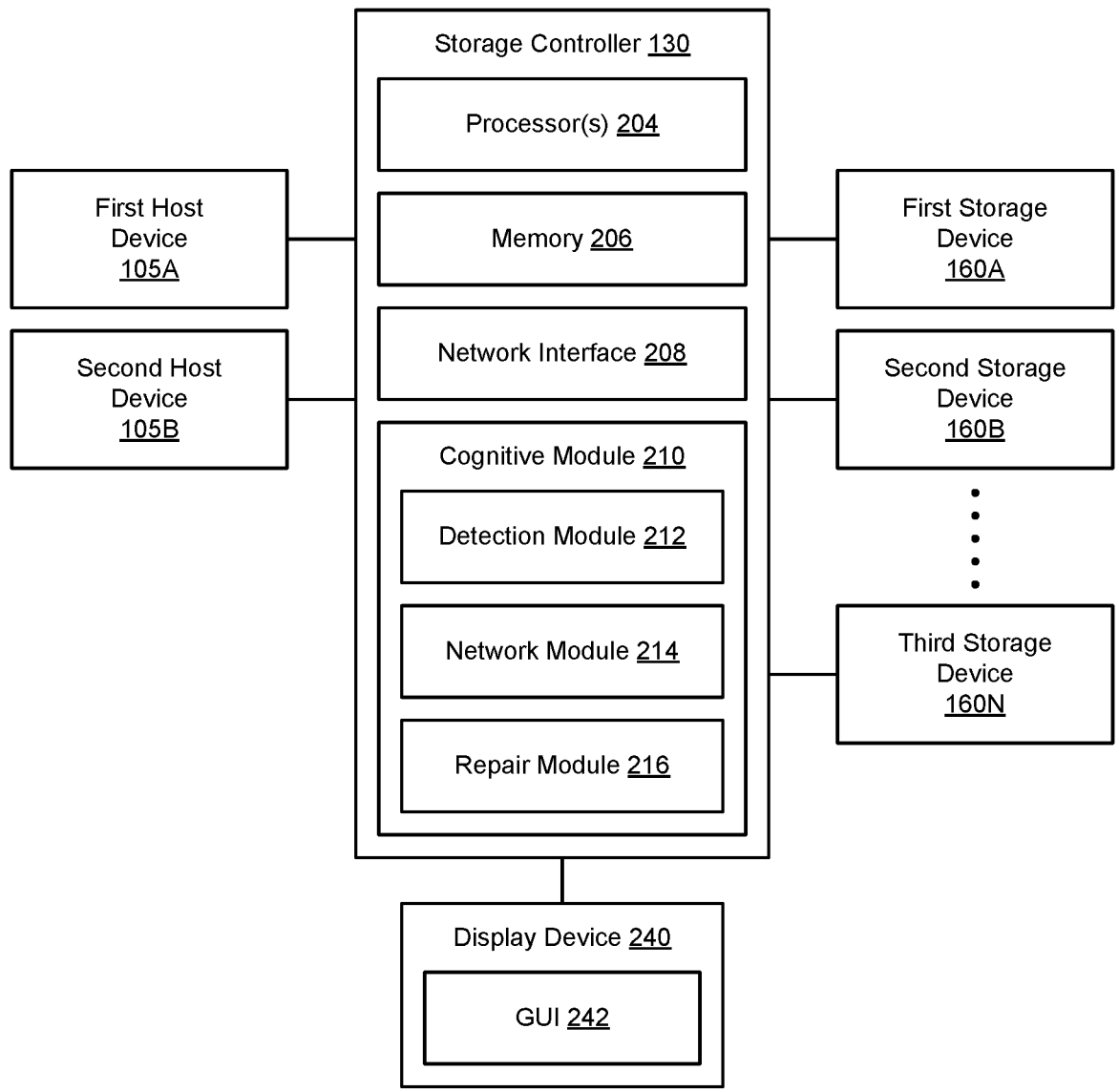
FIG. 2 is a block diagram illustrating one embodiment of an apparatus that uses a storage controller for implementing cognitive feature based code level updates.

FIG. 2 is a block diagram illustrating one embodiment of an apparatus 200 that utilizes a storage controller 130 for implementing cognitive feature based code level updates with various methods and techniques associated therewith. The storage controller 130 operating at the client site. In some scenarios, the storage controller 100 may be used for defect tracking of features running in a customer environment at customer site, and when certain features run at the client site, the storage controller 130 collects information (e.g., code level data and information) related to various tracked features. Further, in some scenarios, various cognitive schemes and/or techniques described herein may refer to analytic services related to computing architecture that is configured to detect and track features running at the client site.

In reference to FIG. 2, the apparatus 200 may be implemented as a system having the storage controller 130 purposed for cognitive feature based code level updates, to thereby transform the storage controller 130 into a special purpose machine dedicated to cognitive feature based code level updates, as described herein. In this implementation, the storage controller 130 may include standard element(s) and/or component(s), including at least one processor(s) 204, memory 206 (e.g., non-transitory computer-readable storage medium), peripherals, power, and various other computing elements and/or components that are not specifically shown in FIG. 2. Further, as shown in FIG. 2, the apparatus 200 may be associated with a display device 240 (e.g., a monitor or other display) that may be used to provide a graphical user interface (GUI) 242. In some implementations, the GUI 242 may be used to receive input from a user (e.g., user input) associated with cognitive feature based code level updates. In other implementations, other user interfaces (e.g., one or more other user input devices or similar) may be used to receive input from other users (e.g., other user input) associated with cognitive feature based code level updates. Further, the apparatus 100 may be associated with one or more databases 160A, 160B, . . . , 160N that are configured to store and record data and information associated with users including cognitive feature based code level updates (including code level data and information) and various communication data and information associated with users.

Accordingly, the apparatus 200 may thus include the storage controller 130 and instructions recorded on the computer-readable medium 206 (or one or more databases 160A, 160B, . . . , 160N) and executable by the at least one processor 204. The storage controller 130 may be utilized to monitor, identify, track, and record various activities of users and features running in a client environment at the client site. Further, the storage controller 130 may include the display device 240 for providing output to a user, and the display device 240 may include the GUI 242 for receiving input from the user. Still further, one or more other user interfaces (UIs) may be used for providing output to other users and receiving input from the other users.

The storage controller 130 may include a network interface 208 adapted for wired and/or wireless communication with various external systems, apparatuses, devices, resources, and/or external networks. For instance, the external resources may include one or more host devices, such as the first host device or apparatus 105A and the second host device or apparatus 105B. In another instance, the external networks may include various types of wired and/or wireless communication networks. The network interface 208 may be embodied as a wireless communication module or component, such as, e.g., a mobile cellular module, a wireless broadband module, a wireless satellite module, and/or various other types of wireless communication modules or components including radio frequency (RF), microwave frequency (MWF), and/or infrared frequency (IRF) components adapted for communication with the various types of wireless communication networks. Further, the network interface 208 may be adapted to interface with a DSL (e.g., Digital Subscriber Line) modem, a PSTN (Public Switched Telephone Network) modem, an Ethernet device, and/or other types of wired and/or wireless network communication devices adapted for communication with the various types of communication networks.

The storage controller 130 may include one or more modules, such as, e.g., a cognitive module 210. In various scenarios, the cognitive module 210 may be used for implementing cognitive feature based code level updates with various cognitive methods and techniques associated therewith. Further, the cognitive module 210 may include one or more other modules, including, e.g., a detection module 212, a network module 214, and a repair module 216 for implementing cognitive feature based code level updates.

The detection module 212 may be used to detect components operating at a client site, collect information associated with the detected components, and identify defects in the detected components based on the collected information. The components operating at the client site may include one or more processing code features running in a client environment at the client site. The collected information may include a code level of the detected components (or features) operating at the client site. The detection module 212 may record a code level of the detected components (or features) operating at the client site when the identified defect occurred. The detection module 212 may store and record the collected information in one or more databases, such as, e.g., the databases 160A, 160B, . . . , 160N, after collecting the information associated with the detected components. The detection module 212 may store and record the detected component (or feature) impacted by the identified defect in one or more databases. The detection module 212 may store and record the code level where the fix list is available in the one or more databases.

In some implementations, the detection module 212 may identify features running in the client environment at the client site and notify (alert, warn) an administrator or other user at the client site that various updates, changes, revisions, alterations, etc. are available (or need) for the identified features. Further, this notification, alert, or warning may include code level updates for feature changes, and the administrator or other user may be allowed to turn-off (or disable) the identified features designated for update. In this instance, the detection module 212 may turn-off the identified features based on user input, and the administrator or other user may be further notified of possible complications and/or risk of operating the client environment at the client site with the identified features turned-off. The administrator or other user may also be notified of exposure complications of operating the client environment at the client site without turning off (or disabling) the identified features. The notifications may be referred to as hyper-notifications that may have various degrees of sensitivity based on a level of risk associated with the identified features. Further, the administrator or other user may be selectively notified of various exposure complications that may be associated with the identified features based on the sensitivity and/or risk associated therewith.

The network module 214 may be used to transfer the collected information to a host apparatus (e.g., first and/or second host devices 105A, 105B) and receive a flash issuance from the host apparatus (e.g., first and/or second host devices 105A, 105B) based on the collected information transferred to the host apparatus. The host apparatus, such as, e.g., the first and/or second host devices 105A, 105B, may be a remotely located server at a host site. In some implementations, the network module 214 may communicate with the network interface 208 for wired and/or wireless communication with one or more external systems, apparatuses, devices, resources, and/or external networks. As such, in some cases, the network module 214 may remotely communicate with the external resources including, e.g., one or more of the host devices, such as the first and/or second host device or apparatus 105A, 105B. In this case, the storage controller 130 may thus communicate with a remotely located server over a wired or wireless communication network.

The repair module 216 may be used to retrieve a fix (or fix list) from the flash issuance received from the host apparatus (e.g., first and/or second host devices 105A, 105B) and implement the fix list for the detected components when defects are identified in the detected components (or features). The repair module 216 may implement the fix list so as to directly impact functionality of the detected components (or features) operating at the client site. The repair module 216 may use the flash issuance to match defects in the detected components (or features) to the fix list to thereby directly implement the fix list for the detected components when defects are identified in the detected components. In some scenarios, matching defects in the detected components (or features) to the fix list may include comparing the code level when the identified defect occurred and comparing the code level when the fix is introduced. Further, the fix list of the flash issuance includes one or more defect entries for the detected components (or features) operating at the client site, and each of the one or more defect entries include a defect number of the identified defect, the code level having an implemented fix, and the detected component (or feature) pertaining to the implemented fix, e.g., in the fix list from the flash issuance.

In various implementations, the repair module 216 may selectively apply or implement fixes based on client preferences or other parameters. The repair module 216 may disable defects in identified features and/or code in the code level running in the client environment at the client site. For instance, the repair module 216 may optionally disable one or more defects in the identified features and/or optionally disable one or more of the detected components when various defects are identified and/or detected until the fix (or fix list) is implemented for the detected features and/or components. As such, one or more detected features and/or components may be optionally disabled until the fix is applied (or code is upgraded to a level with fix). The repair module 216 may automatically implement feature updates and/or disable defects in identified features that need update.

In reference to FIG. 2, the storage controller 130 is shown using functional blocks or modules that represent discrete functionality. However, it should be understood that such illustration is provided for clarity and convenience, and therefore, it should be appreciated that the various functionalities may overlap or be combined within a described block(s) or module(s), and/or may be implemented by one or more additional block(s) or module(s) that are not specifically illustrated in FIG. 2. Further, it should be understood that standard and/or conventional functionality that may be useful to the storage controller 130 of FIG. 2 may be included as well even though such standard and/or conventional elements are not illustrated explicitly, for the sake of clarity and convenience.

Figure 3:
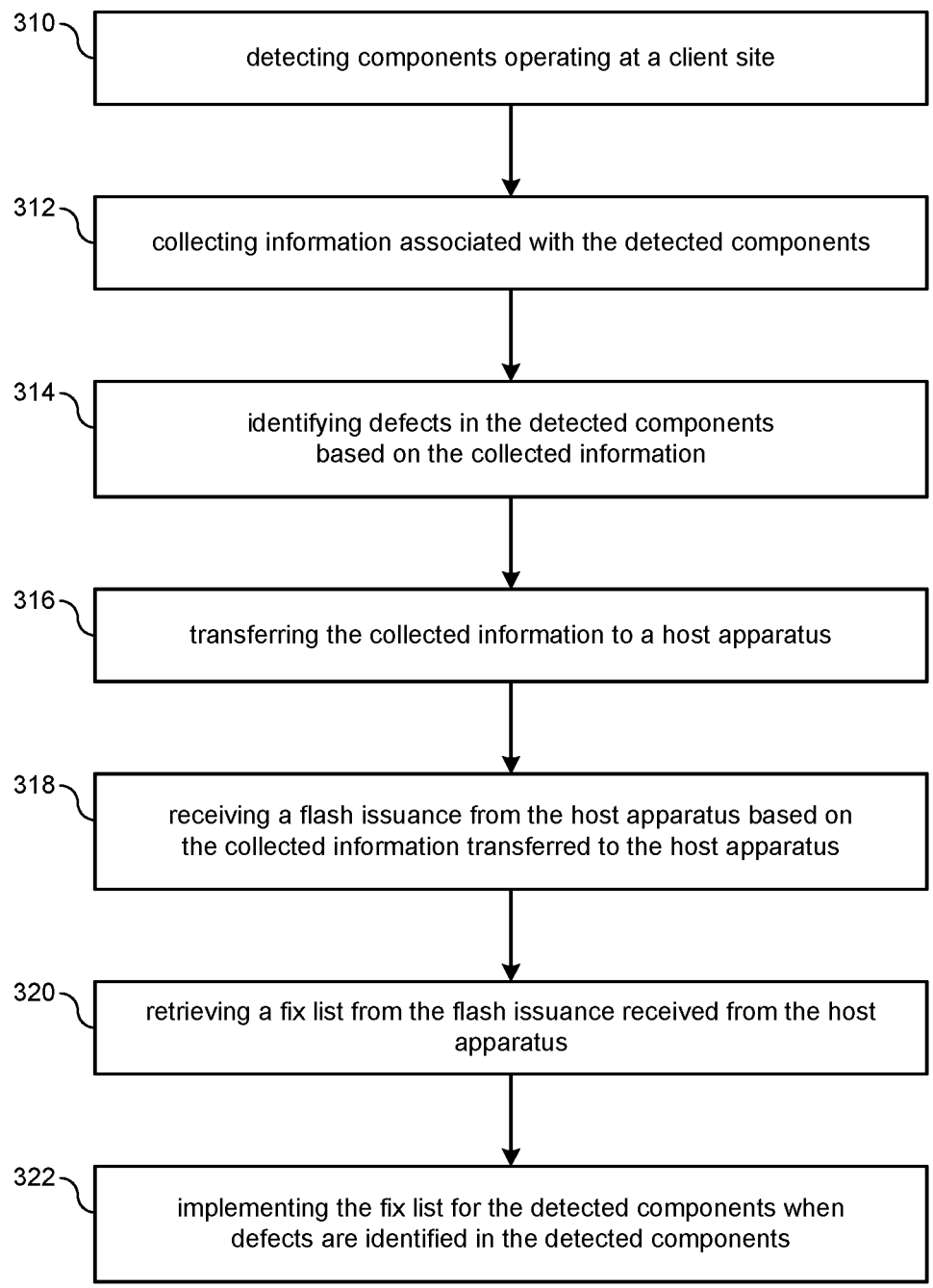
FIG. 3 is a process flow diagram illustrating one embodiment of a method for implementing cognitive feature based code level updates.

FIG. 3 provides a process flow diagram illustrating one embodiment of a method 300 for implementing cognitive feature based code level updates.

It should be understood that even though method 300 may indicate a particular order of operation execution, in some instances, various certain portions of the operations may be executed in a different order, and on different systems. In some other instances, additional operations, blocks, and/or steps may be added to and/or omitted from method 300. Further, the method 300 may be implemented in hardware and/or software. If implemented in hardware, method 300 may be implemented with various computing components, such as, e.g. described herein above in reference to FIGS. 1-2. If implemented in software, the method 300 may be implemented as a program or software instruction process that may be configured for implementing cognitive feature based code level updates as described herein. Further, if implemented in software, instructions related to implementing the method 300 may be stored in memory and/or a database. For instance, a computer or various other computing devices having a processor and memory may be configured to perform method 300.

For instance, in block 310, the method 300 detects components operating at a client site. In some cases, the components operating at the client site may include one or more processing code features running in a client environment at the client site. The method 300 may record the code level of the detected components operating at the client site when the identified defect occurred.

In block 312, the method 300 collects information associated with the detected components, and in block 314, the method 300 identifies defects in the detected components based on the collected information. The collected information may include a code level of the detected components operating at the client site. The method may record the collected information in a database after collecting the information associated with the detected components. The method 300 may record the detected component impacted by the identified defect in the database.

In block 316, the method 300 transfers the collected information to a host apparatus. In block 318, the method 300 receives a flash issuance from the host apparatus based on the collected information transferred to the host apparatus. In some cases, the flash issuance may provide one or more code level updates for the one or more processing code features running in the client environment at the client site.

As described herein, the method 300 may be performed by an apparatus, such as, e.g., a storage controller, operating at the client site. The host apparatus may be implemented with a remotely located server. The storage controller may communicate with the remotely located server over a wired or wireless communication network.

In block 320, the method 300 retrieves a fix list from the flash issuance received from the host apparatus. The method may record the code level where the fix list is available in the database. In some cases, the fix list of the flash issuance may include one or more defect entries for the detected components operating at the client site. Further, in some other cases, each of the one or more defect entries may include a defect number of the identified defect, the code level having an implemented fix, and/or the detected component pertaining to the implemented fix.

In block 322, the method 300 implements the fix list for the detected components when defects are identified in the detected components. The method 300 may implement the fix list so as to directly impact functionality of the detected components operating at the client site. The method 300 may use the flash issuance to match defects in the detected components to the fix list to thereby directly implement the fix list for the detected components when defects are identified in the detected components. Further, in some scenarios, matching defects in the detected components to the fix list may include comparing the code level when the identified defect occurred and comparing the code level when the fix is introduced.

Figure 4:
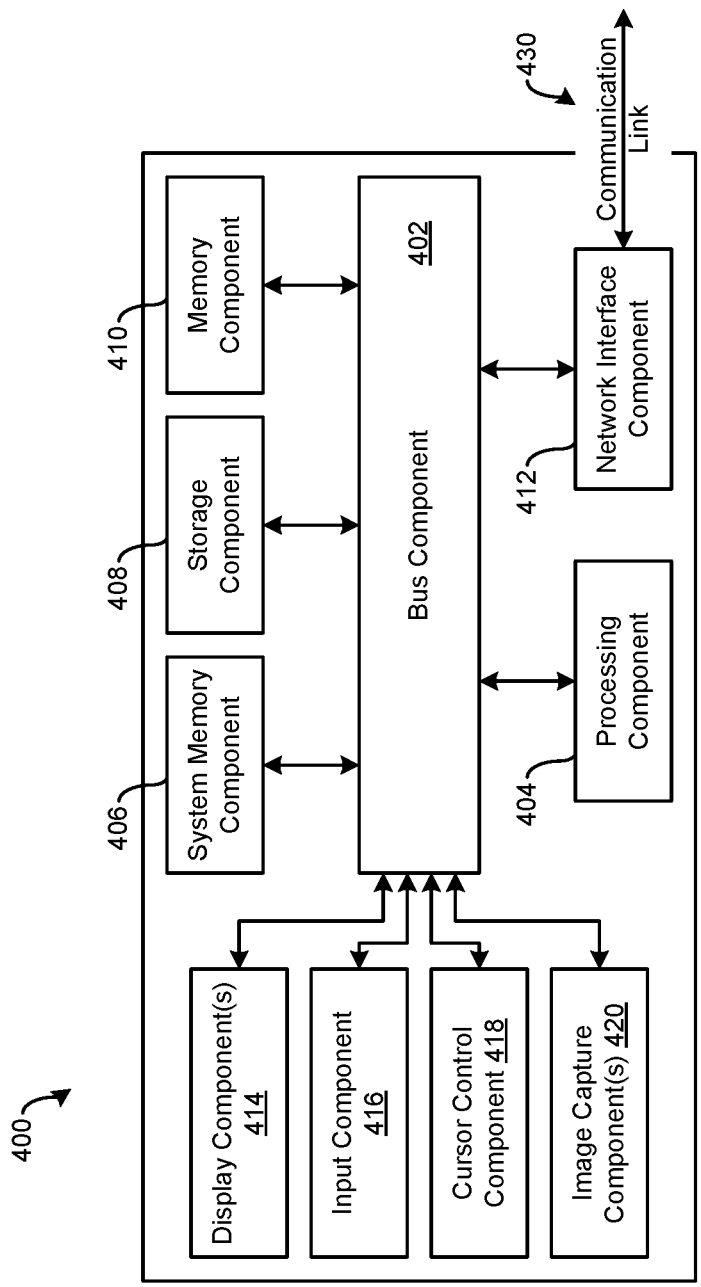
FIG. 4 is a block diagram illustrating one embodiment of a computing device for implementing cognitive feature based code level updates.

FIG. 4 shows a block diagram illustrating one embodiment of a computing device 400 suitable for implementing various methods and techniques associated with cognitive feature based code level updates, including components of an apparatus, such as, e.g., the storage controller 130. In some implementations, the storage controller 130 may include a communication network component 412 that is capable of communicating over one or more wired and/or wireless communication links 430 with the external network resources 180, 182, 184 and the external networks 186. Thus, it should be appreciated that the storage controller 130 may be implemented as the computing device 400 for network computing and communication in a manner as follows.

In accordance with embodiments of the disclosure, the computer system 400 includes a bus 402 and/or other communication mechanism for communicating data and information, which interconnects subsystems and components, including processing component 404 (e.g., processor, micro-controller, digital signal processor (DSP), etc.), system memory component 406 (e.g., RAM), static storage component 408 (e.g., ROM), memory component 410 (e.g., magnetic), network interface component 412 (e.g., modem or Ethernet card), one or more display components 414 (e.g., LCD), input component 416 (e.g., keyboard, push-buttons), cursor control component 418 (e.g., slider), and one or more image capture components 420 (e.g., one or more digital cameras). In one implementation, the memory component 410 may comprise one or more databases having one or more flash drive components, disk drive components, or similar.

In accordance with various embodiments of the disclosure, the computer system 400 may perform specific operations by the processor 404 executing one or more sequences of one or more instructions contained in system memory component 406. Such instructions may be read into the system memory component 406 from another computer readable medium, such as static storage component 408 or memory component 410. In other embodiments, hard-wired circuitry may be used in place of or in combination with software instructions to implement the disclosure.

Logic may be encoded in a computer readable medium, which may refer to any medium that participates in providing instructions to processor 404 for execution. Such a medium may take many forms, including but not limited to, non-volatile media and volatile media. In some implementations, non-volatile media includes optical or magnetic disks, such as memory component 410, and volatile media includes dynamic memory, such as system memory component 406. In some implementations, data and information related to execution instructions may be transmitted to computer system 400 via a transmission media, such as in the form of acoustic or light waves, including those generated during radio frequency (RF) waves, infrared (IR) data communications, and/or microwave (MW) communication. In various implementations, transmission media may include coaxial cables, copper wire, and/or fiber optics, including wires that comprise bus 402.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In some embodiments of the disclosure, execution of instruction sequences to practice the disclosure may be performed by the computer system 400. In some other embodiments of the disclosure, a plurality of computer systems 400 may be coupled by communication link 430 (e.g., LAN, WLAN, PTSN, and/or various other wired or wireless networks, including telecommunications, mobile, and cellular phone networks) and may thus perform various instruction sequences to thereby practice various implementations of the disclosure in coordination with one another.

In various embodiments of the disclosure, the computer system 400 may transmit and receive messages, data, information, and instructions, including one or more programs (i.e., application code) through a communication link 430 and a communication interface 412. Further, received program code may be executed by the processor 404 as received and/or stored in the memory component 410 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the spirit of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus, comprising:
one or more processors; and
a memory comprising executable code, that when executed by the one or more processors, causes the one or more processors to:
  detect components operating at a client site, collect information associated with the detected components, and identify defects in the detected components based on the collected information;
  transfer the collected information to a host apparatus and receive a flash issuance from the host apparatus based on the collected information transferred to the host apparatus;
  disable, in response to identifying a defective component of the detected components, the defective component, identify a first code level of the defective component at a time of the identifying, and retrieve a fix list from the flash issuance received from the host apparatus, wherein the fix list comprises a plurality of entries, each of the plurality of entries including a defect number, a component associated with the defect number, one or more features corresponding to the associated component, a second code level that introduced the defect, and a third code level that implements a fix for at least one of the one or more features;
  compare the first code level with the second code level and the third code level;
  selectively implement, in response to client preferences, the fix list for the one or more features of the defective component, wherein the client preferences include an identification of which features of the one or more features of the defective component are permitted to be automatically updated.

2. The apparatus of claim 1, wherein the components operating at the client site include one or more processing code features running in a client environment at the client site.

3. The apparatus of claim 1, further comprising a database, and wherein the executable code causes the one or more processors to record the collected information in the database after collecting the information associated with the detected components.

4. The apparatus of claim 3, wherein the executable code causes the one or more processors to record the detected component impacted by the identified defect in the database.

5. The apparatus of claim 3, wherein the executable code causes the one or more processors to record the third a code level in the database.

6. The apparatus of claim 1, wherein the executable code causes the one or more processors to disable the detected components when defects are identified in the detected components until the fix list is implemented in the detected components, and wherein the executable code causes the one or more processors to implement the fix list so as to directly impact functionality of the detected components operating at the client site.

7. The apparatus of claim 1, wherein the executable code causes the one or more processors to use the flash issuance to match defects in the detected components to the fix list to thereby directly implement the fix list for the detected components when defects are identified in the detected components.

8. The apparatus of claim 1, wherein the apparatus comprises a storage controller operating at the client site.

9. The apparatus of claim 8, wherein the host apparatus comprises a remotely located server, and wherein the storage controller communicates with the remotely located server over a wired or wireless communication network.

10. A method, comprising:
   detecting components operating at a client site;
   collecting information associated with the detected components;
   identifying defects in the detected components based on the collected information;
   identifying a defective component of the detected components and a first code level of the identified defective component at a time of the identifying;
   transferring the collected information to a host apparatus;
   receiving a flash issuance from the host apparatus based on the collected information transferred to the host apparatus;
   retrieving a fix list from the flash issuance received from the host apparatus, wherein the fix list comprises a plurality of entries including a defect number, a component associated with the defect number, one or more features corresponding to the associated component, a second code level that introduced the defect, and a third code level that implements a fix for at least one of the one or more features;
   disabling, in response to identifying the defective component, the defective component
   comparing the first code level with the second code level and the third code level; and
   selectively implementing, in response to client preference, the fix list for the one or more features of the defective component, wherein the client preferences include an identification of which features of the one or more features of the defective component are permitted to be automatically updated.

11. The method of claim 10, further comprising recording the code level of the detected components operating at the client site when the identified defect occurred.

12. The method of claim 10, further comprising:
   recording the collected information in a database after collecting the information associated with the detected components;
   recording the detected component impacted by the identified defect in the database; and
   recording the code level where the fix list is available in the database.

13. The method of claim 10, wherein the method is performed by a storage controller operating at the client site, wherein the host apparatus comprises a remotely located server, and wherein the storage controller communicates with the remotely located server over a wired or wireless communication network.

14. A non-transitory computer-readable medium having stored thereon a plurality of computer-executable instructions that, when executed by a computer, cause the computer to:
   detect components operating at a client site;
   collect information associated with the detected components;
   identify defects in the detected components based on the collected information;
   identify a defective component of the detected components and a first code level of the identified defective component at a time of the identifying;
   transfer the collected information to a host apparatus;
   receive a flash issuance from the host apparatus based on the collected information transferred to the host apparatus;
   retrieve a fix list from the flash issuance received from the host apparatus, wherein the fix list comprises a plurality of entries including a defect number, a component associated with the defect number, one or more features corresponding to the associated component, a second code level that introduced the defect, and a third code level that implements a fix for at least one of the one or more features;
   disable, in response to identifying the defective component, the defective component;
   compare the first code level with the second code level and the third code level; and
   selectively implement, in response to client preferences, the fix list for the one or more features of the defective component, wherein the client preferences include an identification of which features of the one or more features of the defective component are permitted to be automatically updated.

* * * * *